United States Patent [19]
Fenne

[11] 3,970,782
[45] July 20, 1976

[54] MODULAR CONTROL PANEL DEVICE FOR AUDIO-VISUAL RECEIVING APPARATUS

[75] Inventor: Kenneth R. Fenne, Glen Ellyn, Ill.

[73] Assignee: Quasar Electronics Corporation, Franklin Park, Ill.

[22] Filed: May 2, 1975

[21] Appl. No.: 573,855

[52] U.S. Cl. .............................. 178/7.9; 312/7 TV; 325/353
[51] Int. Cl.² ..................... A47B 81/06; H04B 1/08; H04N 5/645; H05K 5/02
[58] Field of Search ............. 178/7.9; 325/352, 353, 325/355; 312/7 TV

[56] References Cited
UNITED STATES PATENTS

| | | | |
|---|---|---|---|
| 3,184,911 | 5/1965 | Canale | 325/352 |
| 3,622,700 | 11/1971 | Goetz | 178/7.9 |
| 3,708,618 | 1/1973 | Hofmeister | 178/7.9 |

*Primary Examiner*—Howard W. Britton
*Attorney, Agent, or Firm*—LaValle D. Ptak

[57] ABSTRACT

A first panelboard, having a plurality of frequently used primary control elements arranged thereon, and a second panelboard, having a plurality of occasionally used secondary control elements arranged thereon, extend from a base to provide a module which is pivotally carried by the cabinet of an audio-visual receiving apparatus. Detent means interacting between the module and the cabinet selectively retains either panelboard in the display position. In a further embodiment, the module is enclosed within the cabinet and the selected panelboard is displayed through an opening therein.

16 Claims, 5 Drawing Figures

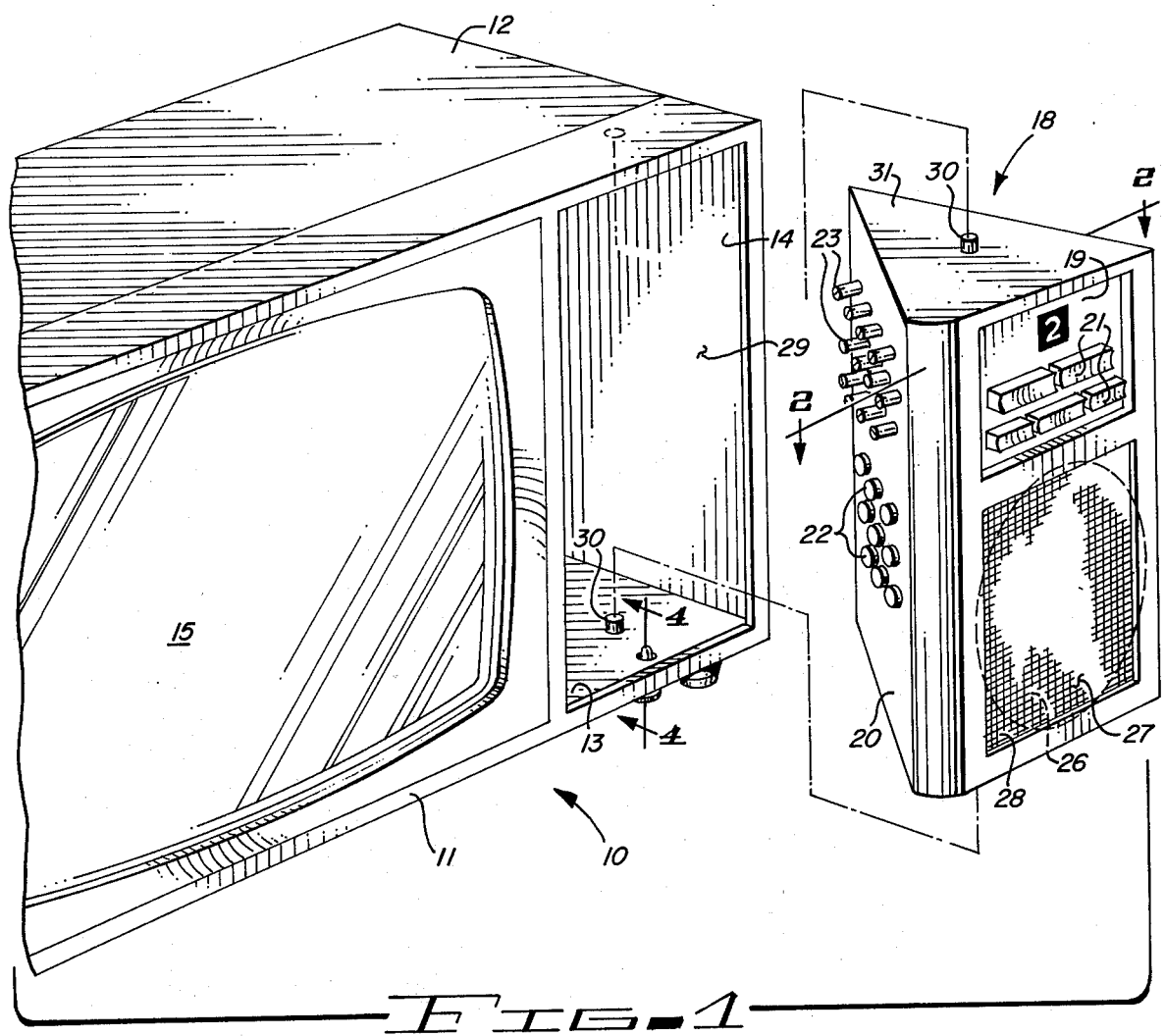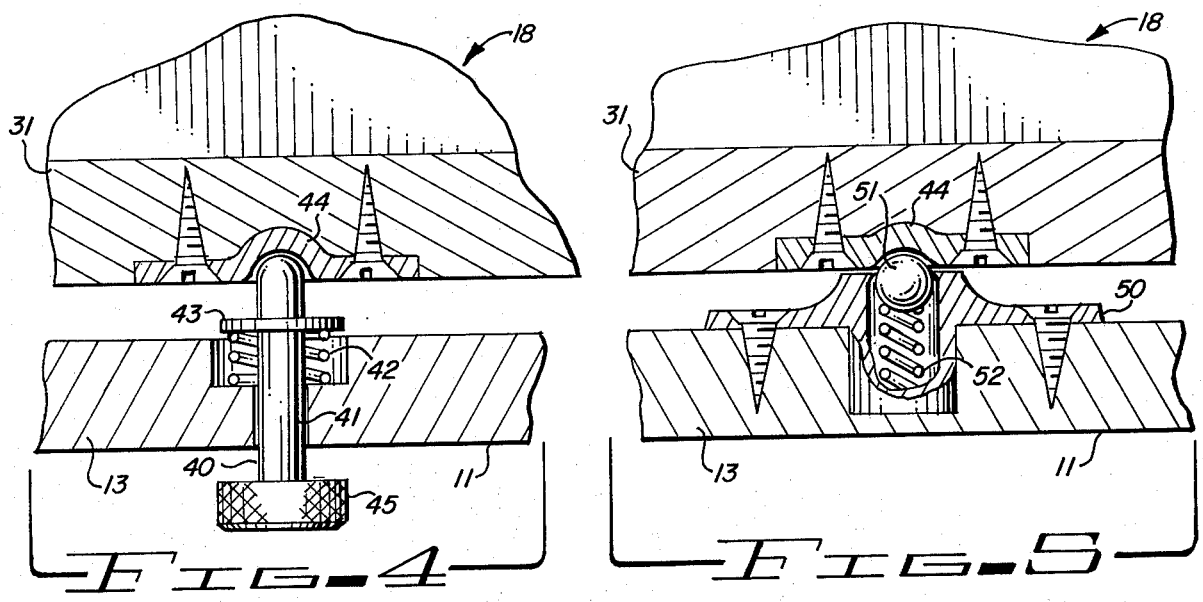

MODULAR CONTROL PANEL DEVICE FOR AUDIO-VISUAL RECEIVING APPARATUS

This invention relates to audio-visual receiving apparatus.

In another aspect, the invention relates to the control elements for tuning, regulating and adjusting an audio-visual receiving apparatus.

More particularly, the invention concerns an improved modular control panel device for holding and displaying the control elements.

Audio-visual receiving apparatus, as exemplified by the conventional television receiver, is endowed with an array of diverse control elements. The control elements, which are manually operable for regulating and adjusting the sound and the picture, are generally divided into two categories. The first group of controls which can be classified as primary are those which are frequently used and include the off-on control, volume control and channel selector. A second set of controls for such adjustments as tone, contrast and hold comprise the secondary controls, which are occasionally adjusted. Also included in the classification of secondary controls are the potentiometers required to initially "set-up" a varactor tuned or electronically tuned receiver. For such receivers, these controls take up a relatively large space on a control panel. Other controls, such as those which adjust the color intensity and color hue, may be placed in either the primary or secondary groupings. The foregoing primary and secondary controls are available for use by the operator of the receiving apparatus. It is recognized that additional controls for service adjustments and usually attended to by trained service personnel are incorporated into the apparatus. For the purpose of the instant application, service adjustment devices may be considered as secondary control devices.

In the conventional television set, the primary controls are generally prominently displayed upon the face of the cabinet adjacent the picture screen. Access to the secondary controls is less convenient. In accordance with the preference of the individual manufacturer, the secondary controls may be placed on the side or rear of the cabinet, or arranged upon a recessed panelboard normally covered by a panel door. The service adjustments may be even more remote. However, potentiometer set-up controls ideally should be accessible on the face of the cabinet along with the primary controls. This greatly crowds the primary control panel if this is done, leaving very little space for a speaker especially on a portable receiver.

The segregation of controls and the placement of specific controls in obscure locations is a universally accepted practice among manufacturers of audio-visual receiving apparatus as an attempt to provide a compact and aesthetically pleasing product. Numerous limitations, however, are inherent with the arrangement. Not a serious problem, but nevertheless an inconvenience and an annoyance to the user, is the fact that visual perception of the picture screen is exceedingly difficult, if not impossible, while adjusting remotely located secondary controls. In those cases where secondary controls are located within the cabinetry, not only is viewing of the picture rendered impossible, requiring a two-person team to effect adjustments, but the receiving apparatus must be partially disassembled. Manufacturing costs are substantially increased by providing the several panelboards and the divergently extending circuitry associated therewith. Correspondingly, due to the additional circuitry and effort necessary to gain access to specific controls, service costs are increased.

No satisfactory solution for the foregoing difficulties has been heretofore devised.

Accordingly, it is a principal object of the present invention to provide an improved control panel device for use in combination with an audio-visual receiving apparatus.

Another object of the present invention is the provision of an improved control panel device incorporating primary and secondary control elements.

Still another object of the present invention is the provision of a control panel device in modular form.

Yet another object of the present invention is to provide a modular control panel device whereby the primary or secondary control elements may be alternately selected for display.

Yet still another object of the present invention is the provision of an improved control panel device which will simplify adjusting, regulating, servicing and other functions associated with the control elements.

A further object of the invention is to provide an improved control panel device to facilitate repair of the control elements.

A still further object of the present invention is the provision of a modular control panel device which will enhance the aesthetic appearance of the receiving apparatus and is consistent with the industrial trend of compact cabinetry.

And yet a further object of the present invention is to provide an improved control panel device as above, which is economically and durably fabricated.

Briefly, to achieve the desired objectives of the improved control panel device of the present invention, in accordance with a preferred embodiment thereof, provided is a module comprising a first panelboard and a second panelboard extending from a base which is pivotally carried by the cabinet of the audio-visual receiving apparatus. A plurality of primary control elements are arranged upon the first panelboard, while the second panelboard has a plurality of secondary control elements arranged thereon. Detent means interacting between the module and the cabinet selectively retains either panelboard in the display position. Alternately, the module is enclosed within the cabinet and arranged such that the selected panelboard is displayed through an aperture within the cabinet. In accordance with a preferred arrangement of the panelboards upon the base and selective placement of the base relative the aperture, the displayed panelboard is substantially flush with the face of the cabinet. The primary panelboard may include means for having the audio speaker operatively carried thereby. Stop means interacting between the cabinet and the module limit rotation thereof in either direction to prevent damage to the wiring extending between the various control elements and the circuitry of the receiving apparatus.

The foregoing and further and more specific objects and advantages of the present invention will become immediately apparent to those skilled in the art from the following detailed description thereof, taken in conjunction with the drawings, in which:

FIG. 1 is a partial perspective view of an audio-visual receiving apparatus, herein specifically illustrated as a television receiver, and embodying the improved control panel device of the present invention which is exploded therefrom for purposes of clarity of illustration;

FIG. 4 is an enlarged vertical sectional view taken along the line 4—4 of FIG. 1 and illustrating in detail detent means for retaining a panelboard in the display position; and FIG. 5 is a view similar to the view of FIG. 4, and illustrating an alternately preferred detent means.

Figure 2:
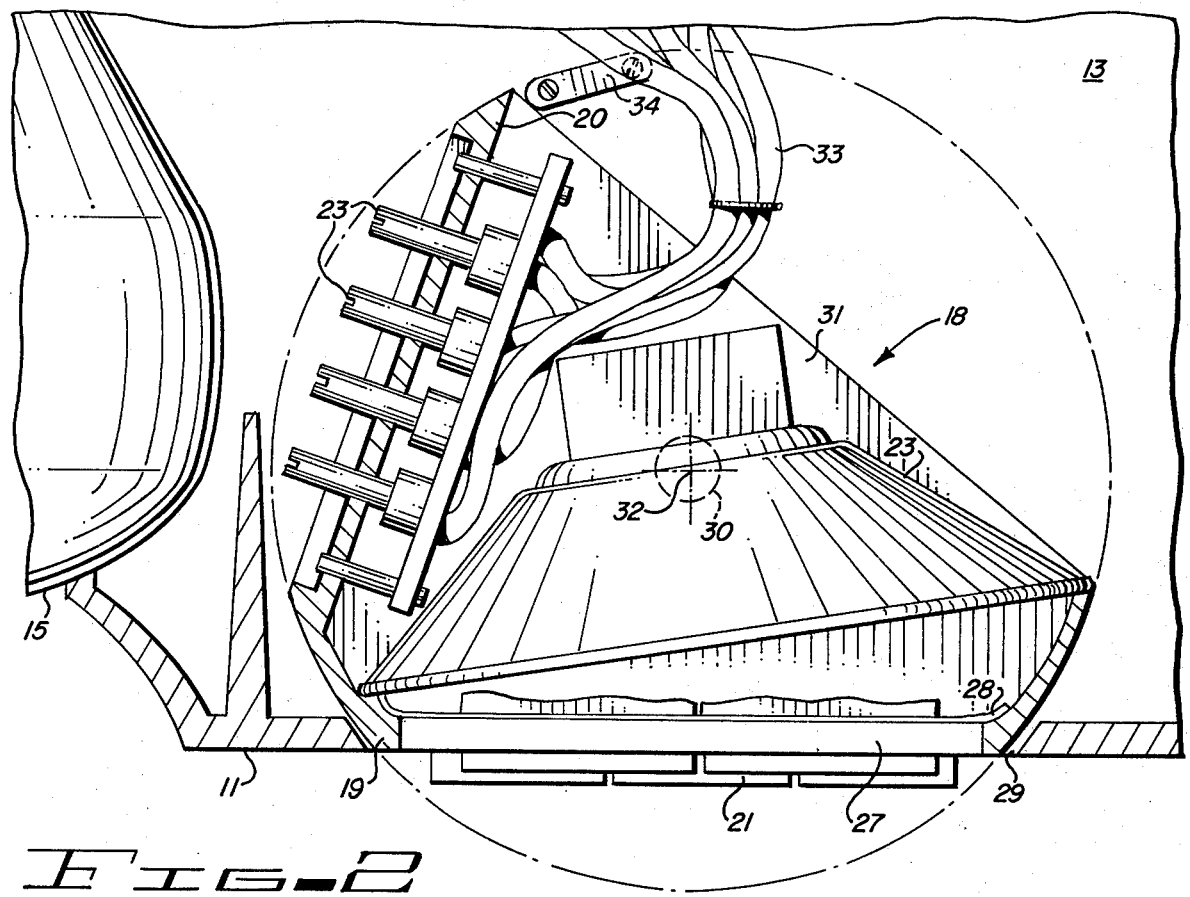
FIG. 2 is a horizontal sectional view of the improved control panel device of FIG. 1, taken along the line 2—2 thereof.

Turning now to the drawings, in which the same reference numerals indicate corresponding elements throughout the several views, attention is first directed to FIG. 1, which shows an audio-visual receiving apparatus, specifically illustrated as a television receiver, generally designated by the reference character 10, comprising a cabinet 11 having top, bottom and side panels 12, 13 and 14, respectively, and a visual display screen 15 which is part of a cathode ray tube. Electronic components and circuitry for receiving, amplifying and otherwise processing the input signals are not herein specifically illustrated, but are generally enclosed within cabinet 11.

The manipulative controls for tuning, adjusting and regulating the television set 10 are incorporated into a modular control panel device 18 constructed in accordance with the teachings of the present invention. Control panel device 18 includes first panelboard 19 and second panelboard 20. A plurality of frequently used primary control elements 21, as exemplified by the off-on control, volume control and channel selector, are arranged upon first panelboard 19. A plurality of occasionally used secondary control elements 22, such as those which adjust the color intensity, the color hue, audio tone control and service adjustments are arranged upon second panelboard 20. Additional potentiometer adjustment controls 23 for use in adjusting or selecting the particular channels to be received by an electronically tuned receiver also are placed on the second panelboard 20. This permits a full-sized audio output speaker, shown by the dashed outline 26, to be mounted within module 18 on the first panelboard 19. The sound waves generated by speaker 26 pass through opening 27 in first panelboard 19, which is covered with a conventional audio sound-permeable grille 28.

Figure 3:
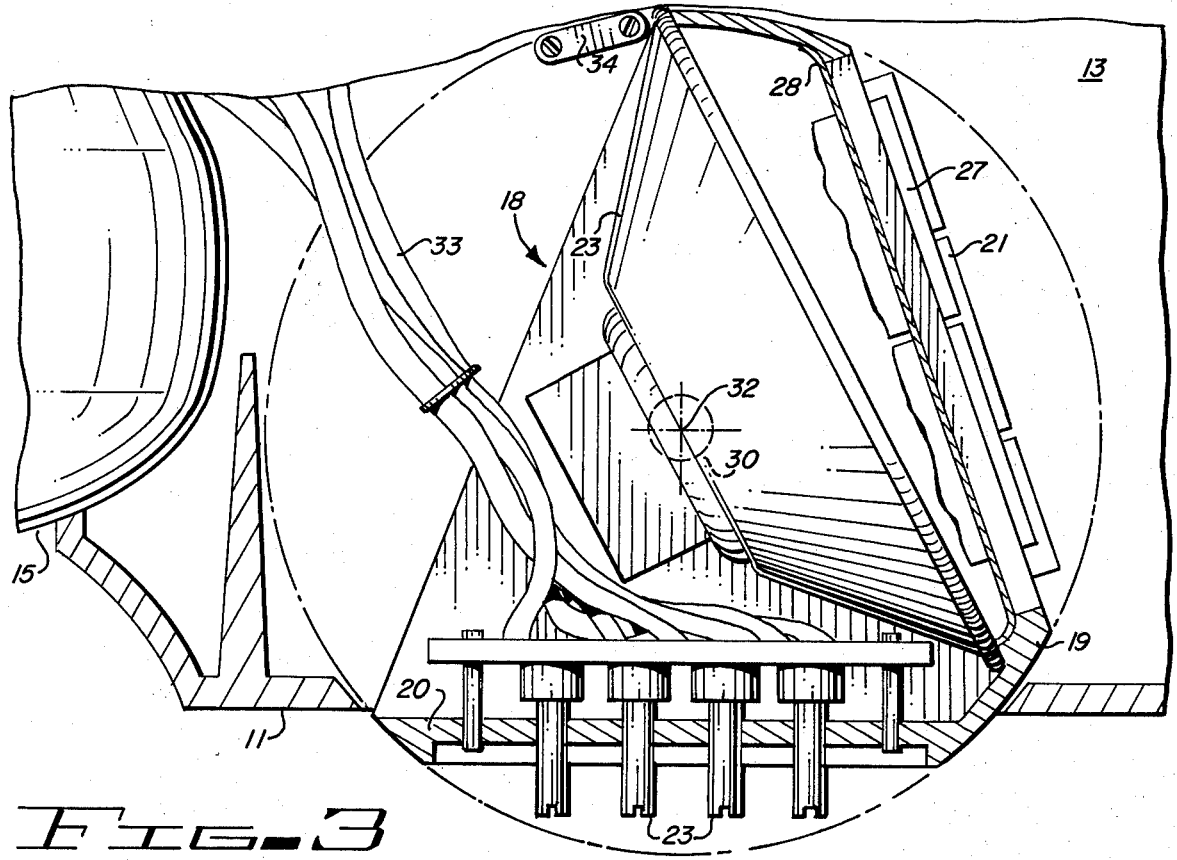
FIG. 3 is a horizontal sectional view corresponding to the illustration of FIG. 2, except having the control panel device rotated to display the alternate panelboard.

As is more clearly illustrated in FIGS. 2 and 3, opening 29 in cabinet 11 is sized and shaped to generally correspond to the dimensions of panelboards 19 and 20. Modular unit 18 is pivotally mounted within cabinet 11 by pins 30. One pin 30 extends upwardly from the bottom 13 of cabinet 11 into base 31 of modular unit 18, while a second pin 30 extends between top panel 12 of cabinet 11 and the top panel 31 of modular unit 18. It is immediately apparent that modular unit 18 is rotatable about longitudinal axis 32 for display of either panelboard 19 or 20 through opening 29. A thrust washer placed over lower pin 30 prevents frictional contact between base 31 and bottom panel 13.

In accordance with the istantly preferred embodiment, panelboards 19 and 20 extend perpendicularly from base 31. Axis of rotation 32 is perpendicular to base 31 and parallel to the planes of panelboards 19 and 20. The distance from axis of rotation 32 to the face of panelboard 19 is equal to the distance of axis of rotation 32 from the face of cabinet 11. The distance from axis of rotation 32 to the face of panelboard 20 is slightly greater to provide space for a slightly larger speaker than could be accommodated if speaker 26 were mounted flush against panelboard 19. However, it will be immediately apparent to those skilled in the art that base 31 may assume the shape of an equilateral triangle, whereby panelboards 19 and 20 are equidistant from axis of rotation 32.

Electric leads 33, either as individual wires or in cable configuration, extend between the various control elements 21, 22 and 23 and the appropriate circuitry within television receiver 10. Pin 34 extending upwardly from bottom panel 13 provides stop means to limit the rotary motion of base 31 in either direction to prevent damage to electric leads 33.

Detent means positionally retain module 18 within cabinet 11 for selectively displaying either panelboard 19 or 20 through opening 29. A preferred detent means, as seen in FIG. 4, includes a shank 40 slidably extending through opening 41 in bottom panel 13. Spring 42, bearing against flange 43, normally urges plunger 40 upwardly to engage socket 44 secured to the underside of base 31. Two such sockets 44 are positioned on the underside of base 31 for relative positioning of panelboards 19 and 20. Knurled fingergrip 45 is used to compress spring 42 and disengage plunger 40 from socket 44 for rotation of modular unit 18.

FIG. 5 illustrates an alternate detent means for cooperating with socket 44. Herein, housing 50 includes captive ball 51 urged upwardly by spring 52. Rotational force applied to module 18 urges captive ball 51 downwardly, compressing spring 52. Continued rotation of modular unit 18 aligns second socket 44 with ball 51.

It will be appreciated from the foregoing detailed description of the preferred embodiment of the present invention that the control panel module thereof provides a compact housing for carrying and displaying the various control elements associated with a conventional audio-visual receiving apparatus. Various changes and modifications to the device herein chosen for illustration will become readily apparent to those skilled in the art. For example, the control module mounted for rotation about a vertical axis, as illustrated, is readily adapted to be rotated about a horizontal axis, thereby displaying the control elements through the top panel of the cabinet. Alternately, the control panel module may project upwardly from the top of the cabinet or be mounted remotely therefrom. Similarly, the preferred control module includes two panelboards and an open side for service access to the various control elements. However, in an exposed environment, a third panelboard, either functional or decorative in character, may be included to provide an enclosed structure. Further, the use of spring-loaded pins 30 similar to the spring-biased detent, as illustrated in FIG. 4., will render the module readily removable from the cabinet.

Having fully described and disclosed the present invention and the preferred embodiments thereof in such clear and concise terms as to enable those skilled in the art to understand and practice the same, the invention claimed is:

1. In an audio-visual receiving apparatus which includes a cabinet having top, bottom and side panels, a visual display screen,
an audio output speaker,
a plurality of primary manually operable control devices,
a plurality of secondary manually operable control devices, and
electronic receiving, amplifying and control circuitry associated with said screen and said speaker and responsive to said primary and said secondary control devices, an improved control panel device for use in combination therewith to provide improved accessibility to said control devices for manipulation and servicing thereof, said improved control panel device comprising:
  a. a base pivotally carried by said cabinet;
  b. a first panelboard extending from said base and having said primary control devices arranged thereon; and
  c. a second panelboard extending from said base and having said secondary control devices arranged thereon.

2. The improved control panel device of claim 1, wherein said base is pivotal about a vertical axis.

3. The improved control panel device of claim 1, wherein said base is pivotal about a horizontal axis.

4. The improved control panel device of claim 1, wherein said control panel device is removably carried by said cabinet.

5. The improved control panel device of claim 1, further including mounting means for securing said audio output speaker thereto.

6. The improved control panel device of claim 5 wherein said first panelboard includes:
  a. means defining an aperture therein for the transmission of sound waves therethrough from said speaker; and
  b. an audio sound-permeable grille extending over said aperture means.

7. The improved control panel device of claim 1, further including detent means interacting between said panel device and said cabinet for checking the pivotal movement of said base and for selectively retaining said first panelboard and said second panelboard in a predetermined position.

8. The improved control panel device of claim 7, further including stop means interacting between said panel device and said cabinet for limiting the rotation of said base in either direction.

9. The improved control panel device of claim 8, wherein said first and said second panelboards are perpendicular relative said base.

10. The improved control panel device of claim 9, wherein said second panelboard is angularly defined relative said first panelboard.

11. The improved control panel device of claim 10, wherein the angle between said first and said second panelboard is 60°.

12. In an audio-visual receiving apparatus which includes
a cabinet having top, bottom and side panels,
a visual display screen,
an audio output speaker,
a plurality of primary manually operable control devices,
a plurality of secondary manually operable control devices, and
electronic receiving, amplifying and control circuitry associated with said screen and said speaker and responsive to said primary and said secondary control devices,
an improved control panel device for use in combination therewith to provide improved accessibility to said control devices for manipulation and servicing thereof, said improved control panel device comprising:
  a. a base pivotally carried within said cabinet;
  b. a first panelboard extending perpendicularly from said base and having said primary control devices arranged thereon;
  c. a second panelboard extending perpendicularly from said base and angularly defined relative said first panelboard and having said secondary control devices arranged thereon;
  d. means defining an aperture within one of said cabinet panels for providing access therethrough to said control panel device;
  e. detent means interacting between said panel device and said cabinet for selectively retaining said first panelboard and said second panelboard in predetermined alignment with said aperture means; and
  f. stop means interacting between said panel device and said cabinet for limiting the rotation of said base in either direction.

13. The improved control panel device of claim 12, further including:
  a. mounting means for securing said audio output speaker thereto;
  b. means defining an aperture in said first panelboard for the transmission of sound waves therethrough from said speaker; and
  c. an audio sound-permeable grille extending over said aperture means.

14. The improved control panel device of claim 12, wherein the axis of rotation of said pivotal base is parallel to the plane of said panel of said cabinet having said aperture means therein.

15. The improved control panel device of claim 14, wherein said first and said second panelboards are commonly dimensioned and said aperture means in said cabinet is sized and shaped to receive either of said panelboards therethrough.

16. The improved control panel device of claim 15, wherein said first and second panelboards are equidistant from the axis of rotation of said pivotal base and which distance is equal to the distance from the face of said cabinet panel having said aperture means therein and said axis of rotation whereby the face of each said panelboard is substantially flush with the face of said cabinet panel when said detent means are engaged and said respective panelboard is aligned with said aperture means.

* * * * *